(12) United States Patent
Walsh

(10) Patent No.: US 7,001,112 B2
(45) Date of Patent: Feb. 21, 2006

(54) GEOGRID OR MESH STRUCTURE

(75) Inventor: Anthony T. Walsh, Lancashire (GB)

(73) Assignee: Tensar International Limited, Blackburn (GB)

( * ) Notice: Subject to any disclaimer, the term of this patent is extended or adjusted under 35 U.S.C. 154(b) by 0 days.

(21) Appl. No.: 10/603,784

(22) Filed: Jun. 26, 2003

(65) Prior Publication Data

US 2004/0062615 A1    Apr. 1, 2004

(30) Foreign Application Priority Data

Jun. 27, 2002  (GB) ................................. 0214931

(51) Int. Cl.
 *B29D 7/00* (2006.01)
 *E02D 17/20* (2006.01)
(52) U.S. Cl. .................................................. 405/302.7
(58) Field of Classification Search ............. 405/302.7, 405/302.6, 302.4
 See application file for complete search history.

(56) References Cited

U.S. PATENT DOCUMENTS

| | | | |
|---|---|---|---|
| 3,386,876 A | | 6/1968 | Wyckoff |
| 3,616,154 A | | 10/1971 | Dow et al. |
| 4,374,798 A | | 2/1983 | Mercer |
| 4,536,429 A | | 8/1985 | Mercer |
| 4,590,029 A | | 5/1986 | Mercer |
| 5,053,264 A | | 10/1991 | Beretta |
| 5,156,495 A | | 10/1992 | Mercer |
| 5,267,816 A | * | 12/1993 | Mercer et al. ........... 405/302.7 |
| 5,269,631 A | | 12/1993 | Mercer et al. |
| 5,419,659 A | * | 5/1995 | Mercer .................... 405/302.7 |
| 5,851,089 A | * | 12/1998 | Beretta ................... 405/302.7 |
| 6,019,550 A | | 2/2000 | Wrigley et al. |
| 6,343,895 B1 | * | 2/2002 | Yamada et al. ......... 405/302.7 |

FOREIGN PATENT DOCUMENTS

| | | |
|---|---|---|
| EP | 0 418 104 A2 | 3/1991 |
| EP | 0 515 233 A2 | 11/1992 |
| GB | 1 075 487 | 7/1967 |
| GB | 2 034 240 A | 6/1980 |

(Continued)

*Primary Examiner*—Frederick L. Lagman
(74) *Attorney, Agent, or Firm*—Dickstein Shapiro Morin & Oshinsky LLP

(57) ABSTRACT

To make an oriented plastics material geogrid 10 in which oriented strands 6, 9 form triangular meshes with a junction 11 at each corner and six of the strands 6, 9 meet at each junction 11, a plastics material sheet starting material 1 has holes 2 in an array of hexagons 3, opposite holes 2 of each hexagon being aligned in the machine direction, and the starting material 1 is stretched first in the machine direction and secondly in the transverse direction. In the eventual geogrid 10, the centre portions of the hexagons in the starting material 1 form the junctions 11. The centres of the junctions 11 are slightly biaxially oriented, but at the edges of the junctions 11, the orientation of the edge of substantially each strand 6 or 9 runs around the edge of the respective junction 11 and into the edge of the next strand 6 or 9. During the second stretch, restraint can be applied in the first stretch direction and discontinued before the material is allowed to relax in the second stretch direction. If desired, the procedure can be terminated after the first stretch, to produce a uniaxially-oriented geogrid. By using a starting material 21 which has through holes 22 and weakened zones 23, it is possible to form the geogrid of the invention from a starting material 21 having a rectangular array of through holes 22.

61 Claims, 13 Drawing Sheets

FOREIGN PATENT DOCUMENTS

| | | |
|---|---|---|
| GB | 2 034 240 A | 6/1980 |
| GB | 2 096 531 A | 11/1982 |
| GB | 2 108 896 A | 5/1983 |
| GB | 20 128 132 A | 4/1984 |
| GB | 2 256 165 A | 12/1992 |
| GB | 2 295 353 A | 5/1996 |
| JP | 2001-323 469 A | 11/2001 |
| WO | WO 99/28563 | 6/1999 |

* cited by examiner

GEOGRID OR MESH STRUCTURE

BACKGROUND OF THE INVENTION

The present invention relates in general to geogrids though there is some applicability to mesh structures in general. A geogrid is a grid whose primary purpose is to strengthen or reinforce soil and has open meshes into which soil particles can lock. If made by orienting a plastics starting material, the starting material would normally have a thickness greater than about 1, 1.5 or 2 mm. A geogrid is in effect made up of strands (also called ribs) which are interconnected at bars running across the geogrid in the TD or are interconnected at junctions (also called nodes or intersections), whether or not the strands are continuous throughout the geogrid as they would be in the case of say a woven geogrid. The thickness of a geogrid, as measured at the junction, would be greater than about 0.5 mm or 0.75 mm and may well be greater than about 1.00 mm or 1.5 mm or 2.0 mm. The mesh size (also called mesh opening size or aperture size) should if possible be capable of allowing the soil or aggregate particles to interact therewith and provide optimum anchoring or interlock.

Geogrids can be manufactured in many different ways, for instance by stitch bonding fabrics made of for instance polyester filaments and applying a flexible coating such as a PVC coating, or by weaving or by knitting, or even by spot-welding oriented plastic strands together. However, although not confined to such materials, the present invention is primarily concerned with geogrids which are formed by uniaxially or biaxially orienting a plastics sheet starting material which has been provided with holes. The holes form meshes in the product. In a uniax geogrid of this type, transverse bars are interconnected by strands. Biax geogrids of this type comprise oriented strands and junctions at which the strands meet, substantially each strand having each end connected to such a junction, whereby sets of parallel tensile members run through the geogrid, each tensile member being formed of a succession of substantially aligned strands and respective said junctions interconnecting the strands.

The present invention also relates to methods of making geogrids. In methods using a plastics sheet starting material which has been provided with holes, a stretch is applied to stretch out strand-forming zones between adjacent holes and form oriented strands from such zones, thereby providing a uniax geogrid. A stretch can be applied in a direction at right angles to the first stretch to stretch out other strand-forming zones between other adjacent holes and form oriented strands from the latter zones, whereby zones between groups of holes form junctions interconnecting the oriented strands and a biax geogrid is formed.

U.S. Pat. No. 4,374,798 and U.S. Pat. No. 5,053,264 disclose uniax and biax mesh structures of the general type with which the present invention is concerned, but it has now been appreciated that those mesh structures do not have great stability in the diagonal direction in that the mesh structures can be extended in the diagonal direction without great application of force due to parallelogram distortion of the mesh structure.

Uniax geogrids are extensively used where the stress is primarily in one direction, for instance when reinforcing embankments. In such structures, stresses are transferred from the soil along the strands and into the transverse (TD) bars which can be thicker than the strands and are anchored in the soil. Biax geogrids are extensively used in the reinforcement of granular layers in roads, parking areas, container storage areas and other hard standings. The strands extend in the MD and in the TD. As a consequence, the physical properties of the mesh structures are optimal in these two directions. However, it has been appreciated that there are weaknesses in the structure when tested between these two directions. Thus while the previous geogrids have high strength and stiffness in the longitudinal and transverse directions, it has now been appreciated that the loading from for example a heavy wheeled vehicle imposes radial stresses in the geogrid, i.e. stresses radiating in all directions from the loading zone.

It is desirable to provide more strength in directions other than the MD and TD without grossly reducing the strength of the mesh structure in at least one of the MD and TD.

It is an object of the present invention to overcome or ameliorate at least one of the disadvantages of the prior art, or to provide a useful alternative.

Any discussion of the prior art throughout the specification is not an admission that such prior art is widely known or forms part of common general knowledge in the field.

THE INVENTION

The invention provides geogrids or mesh structures and methods. The invention also extends to a method of strengthening a particulate material, comprising embedding in the particulate material a geogrid of the invention, and further extends to a particulate material so strengthened and to a geotechnical construction comprising a mass of particulate material strengthened by embedding therein a geogrid of the invention.

Geogrids of the invention provide pairs of angled strands between the transverse bars or further oriented strands and reduces any tendency for relative movement between the strands and the soil, creating a stiffer and more effective reinforcement anchor. In effect, it has been found that by careful choice of the number and geometry of the holes in the starting material, angled strands could be produced as an integral feature of the geogrid design. Possible advantages of such geogrids can be increased in-plane torsional stiffness or rigidity (important for interlock), increased flexural modulus, improved multi-directional property performance, diverse soil or aggregate interlock properties, greater resistance to shear forces and the enhanced ability to carry and/or distribute greater loads in general and radial loads in particular. If a piece of the geogrid is tested with a fully restrained periphery, for a given load normal to the plane of the geogrid, the deflection is lower than for comparable conventional biax geogrids (increased flexural modulus), and the deflection is less localised around the point of application of the load, i.e., is more evenly distributed across the sample. This indicates that the load on the conventional geogrid is born by a relatively small number of strands within the immediate loading area (a four-strand junction) whereas the geogrid of the invention has more paths to carry the load away from the loading area (an at least six-strand junction). Testing was carried out only with a relatively small load, but it is believed that there is good correlation between the applied load and the corresponding deflection of the geogrid and that extrapolations to higher loads would be valid. Compared to a comparable conventional biax geogrid, the geogrid of the invention has a combination of tensile strength and stiffness properties that improves the provision of multi-axial performance by permitting the dispersion of an applied load over 360°. All these properties are important when considering the interlock of the geogrid with soil or aggregate.

In one geogrid, triangular meshes of the geogrid provide a robust structure having high tensile strengths along said tensile members. One series of tensile members can extend in the MD or in the TD, and it is found that in the direction at right angles, the geogrid has good strength because extension would require buckling of oriented strands running at right angles to the force applied and such buckling is impeded by soil in which the geogrid is buried. The triangular mesh produces a structure with quasi isotropic properties in the plane of the geogrid, which enables the geogrid to distribute load more uniformally in geotechnical applications; if the strength of the geogrid is measured around 360°, there will be at least six peaks but the dips are less great than with rectangular structures. Thus the geogrid is more able to carry radial stresses, with less deformation, leading to a stiffer and more effective anchor in soil reinforcing applications and also leading to more effective load distribution when used to support, e.g., wheeled vehicle loading or point loading such as imposed by heavy construction equipment. Oriented polymers are particularly well suited for geotechnical applications as the typical stresses are highly directional along the tensile members, the high directionality of oriented polymer materials enabling the material's stiffness and strength to be directed along the length. Using the invention, roughly 50% by weight of the material is in the strands, the remainder being in the junctions, as is also the case for comparable conventional biax geogrids. However, the starting material thickness can be reduced significantly, while producing a geogrid with similar soil reinforcement properties. For example, the equivalent starting material thickness for a geogrid of the invention can be 4.7 mm while a comparable conventional biax geogrid has a starting material thickness of 6.8 mm. One reason is that the strands in the geogrids of the invention can be wider (due to having wider strand-forming zones in the starting material); thus if required, the geometry of the starting material allows the strands to be thinner and wider, which increases the in-plane torsional strength of the geogrid.

The tensile members which are formed provide the strength of the geogrid, and are not just thin, highly oriented filaments formed by the rupture of a membrane.

The invention can provide a technique for relatively inexpensively forming a more complex pattern of holes, for instance from a starting material that has been punched with a simple "square" pattern, and the final pattern can for instance be as in GB 2 034 240 A, GB 2 096 531 A or GB 2 108 896 A.

Definitions

The term "oriented" means molecularly-oriented. In general, when an oriented strand is referred to, the preferred direction of orientation is longitudinal of the strand.

"Uniax" and "biax" mean uniaxially-oriented and biaxially-oriented, respectively.

In relation to a mesh structure, "biaxially-oriented" means that the mesh structure has been stretched in two directions generally at right angles to each other.

The holes in the starting material may be through-holes or blind holes. If the holes are blind, the film or membrane in the hole will either rupture on stretching, or may remain as a thin membrane. The holes can be formed by punching them out from the starting material, as disclosed in U.S. Pat. No. 4,374,798, or can be formed by extrusion as disclosed in U.S. Pat. No. 5,053,264, or can be formed by suitable embossing, or in any other appropriate manner.

"Strictly uniplanar" means that the material or structure is symmetrical about a median plane parallel to its faces. In general, a uniplanar starting material will give a uniplanar structure when stretched.

"Substantially uniplanar" means that the material or structure does not deviate so much from strict uniplanarity that orientation is not comparable on each face of the biax product.

"Effectively rectilinear" means that some deviation from rectilinearity is permitted provided the tensile members do not increase in length (extend) excessively longitudinally of the tensile member as they align. In general, it is preferred that there should not be more than about 5%, 4% or 3% geometrical extension or even not more than about 1% or 0.5%, before taking up the force. Alternatively, the axes of the individual strands in any tensile member should be substantially parallel but some lateral displacement is acceptable provided it is not too great, e.g. not greater than about 25% or 20% of the junction mid-point: junction mid-point distance ("relative lateral displacement") in extreme cases, but preferably not more than about 12%, 10%, 7% or even 4%. Some lateral displacement is inevitable in industrial production as the whole formation cannot be precisely accurate.

The "geometrical extension" is the extension along the tensile member which would be caused by strictly aligning the strands of the tensile member, ignoring any extension of the material itself, this can be considered as notionally pivoting the junctions about their mid-point and pivoting the strands relative to junctions about the points where the strand centre lines meet the junctions.

The "starting material" is the material immediately before initiation of the first stretch.

The stretch ratios are as measured cold after releasing the stretching force or after annealing if annealing is carried out, and as measured on the surface of the structure.

"MD" is the machine direction, or in experimental work, the anticipated machine direction, normally the long dimension of the geogrid.

"TD" is the transverse direction, or in experimental work, the anticipated transverse direction, substantially at right angles to the MD.

The "hexagons" are notional shapes defined by the centres of the holes.

"Truth lines" are parallel lines applied (normally by printing or drawing) to the starting material, normally but not necessarily in two directions parallel to the MD and TD respectively. Truth lines are only used for experimental work and are not normally used in production runs.

"Pitch" is the distance from the centre of one hole to the centre of the next hole in the direction indicated.

When considering holes in the starting material in an array of hexagons whose vertices are aligned in the direction of stretching, the "vertex pitch" of the hexagon is the distance between the centre of one hole to the centre of the opposite hole in the stretch direction (in FIGS. 7 and 8, referred to below, this distance is 18.5 mm and 20.38 mm respectively), the "diagonal pitch" is the corresponding distance between respective opposite pairs of the other holes, the "major pitch" is the stretch direction distance between the centres of two adjacent holes which are aligned in the stretch direction (in FIGS. 7 and 8, this distance is 10.5 mm and 11.52 mm respectively), and the "minor pitch" is the stretch direction distance between the centre of the end hole of the hexagon and the centres of the next two holes of the hexagon as considered in the stretch direction (in FIGS. 7 and 8, this distance is 4 mm and 4.43 mm respectively).

The term "particulate material" includes rocks, stones, gravel, sand, earth, clay, aggregate held by a binder such as asphalt or cement, concrete, or any other particulate or cohesive material used in geotechnical engineering or building. The terms "soil" or aggregate as used herein have the same meaning as "particulate material".

A "comparable conventional biax geogrid" is a conventional biax geogrid made by stretching a plastics sheet starting material and stretching biaxially, the starting material being the same plastics material and the geogrid having the same weight per unit area and the same mesh size as measured by passing a sphere through the meshes. However, experience of using the soil or aggregate particles which are met in practice suggests that, for certain particulate materials, for strict comparability with square or rectangular meshes, the size of triangular meshes should be somewhat smaller than that indicated by such a sphere.

Preferred Features

The dependent claims set forth preferred and/or optional features of the invention. In the uniax geogrids, the angled strands extend at a substantial angle to the MD, which would be more than about 3°, 4° or 5° and is preferably less than about 7.5°. Preferably the geogrids should be substantially symmetrical about MD and TD axes and about other axes. Preferably all the oriented strands are of substantially equal length and preferably have comparable stretch ratios at the centre points of the strands though the overall stretch ratios (junction mid-point to junction mid-point) may not be substantially equal. In the preferred geogrid, there are three sets of continuous tensile members, forming triangular meshes. In the method of claim 17, in a general sense, if each hexagon in the starting material is positioned so that two opposite holes delineating the hexagon are substantially aligned in the MD, the geogrid will have TD strands but no MD strands—there will be two sets of strands (i.e. of the tensile members) at say roughly 30° to the MD, forming triangular meshes with a said junction at each corner.

It was found on stretching that if the hexagons were regular hexagons, there was a tendency for the angled oriented strands entering opposite sides of a junction to be slightly offset, i.e., not to be perfectly aligned. This gave a slight strength reduction. It has been found that this offset can be reduced or eliminated if in the starting material the angles of any hexagon are not equal though all the sides of the hexagon can be substantially equal. In one arrangement, the hexagons are slightly foreshortened in the MD so that the MD vertex pitch is less than the diagonal pitch. The minimum ratio of the MD vertex pitch to the diagonal pitch is preferably about 0.75:1 or 0.8:1 and the maximum ratio is preferably about 0.95:1 or about 0.9:1, a suitable ratio being about 0.85:1. Put the other way and giving slightly different values, the minimum ratio may be about 1:1.1 or 1:1.14 and the maximum ratio may be about 1:1.3 or 1:1.23, a preferred value being about 1:1.17. Another way of determining the difference between the preferred hexagon and a regular hexagon is to consider the ratio between the major MD pitch and the minor MD pitch. A regular hexagon gives a ratio of 2:1. In one experimental procedure, the ratio of the major MD pitch to the minor MD pitch was varied and the TD pitch was varied in order to keep the strand-forming zone widths the same. It was found that a ratio of within the range of about 2.1:1 to about 3.2:1 provided a reasonably regular geogrid with more or less aligned strands, though the production of such a geogrid was less likely at the extremities of the range; substantial alignment was obtained in one geogrid in a ratio range of from about 2.5:1 to about 2.7:1.

The preferred ratio was about 2.6:1. At the top end of the range (nearing 3.2:1), an offset of the angled ribs occurred due to the widening of the junction, i.e. the junction had a greater dimension in the TD than in the MD. The geometrical extension was 0.4% in one example where the ratio was 3.3:1 (just above the preferred range). At the bottom end of the range (nearing 2.1:1), an offset of the angled ribs occurred due to the narrowing of the junction, i.e. the junction had a greater dimension in the MD than in the TD. The geometrical extension was 0.3% in one example where the ratio was 2:1 (just below the preferred range).

If the starting material has weakened zones, it is preferred that during stretching the weakened zones have a percentage reduction at their centre points which is at least about twice, three times or four times that of the non-weakened zones.

When made by orienting a plastics sheet starting material, any suitable plastics material can be used, such as polypropylene or high density polyethylene, though different plastics materials have different stretching behaviours. Preferably, the starting material is strictly uniplanar, which can be achieved by extruding the starting material and punching. However, satisfactory results can be obtained with any substantially uniplanar starting material.

For biax geogrids, normal practice is to carry out the stretches sequentially and to carry out the first stretch in the MD because this is found to give a more even and controllable product—in production the MD stretch can be carried out using stretching rolls and the second, TD stretch using a stenter. However, it is possible to carry out the first stretch in the TD but the product is less even because some MD strands start to stretch and all strand-forming zones are affected during the first stretch. If a suitable stenter could be designed, it would be possible to carry out both stretches simultaneously.

In the biax geogrid made by biaxially orienting a plastic sheet starting material which is being provided with holes, it is preferred that at substantially each junction, the crotch between adjacent strands is oriented in the direction running around the crotch, whereby there is continuous orientation from the edge of one strand, around the crotch and to the edge of the adjacent strand. It is preferred that the centre of substantially of each junction is oriented but substantially less oriented than the centre points of the strands, and is preferably biaxially oriented. The centre of substantially each junction preferably has reduced in thickness by less than about 20%.

In practice, it is impossible to have precise control on the uniformity of the final structure. However, for the biax geogrids, it is desirable, not only for aesthetic reasons but also for improved multi-directional strength, to produce a structure in which the triangles of the meshes are substantially equilateral, i.e. the angles between the tensile members of the three series are substantially 60°. However, angles other than 60° can be chosen for certain applications, e.g. when providing unidirectional stress. Such non-uniform structures could be provided by a modified punch pattern or by a reduced TD stretch, or even by applying a larger TD stretch to give more TD cover.

The holes can be any suitable shape, such as circular, square, rectangular or hexagonal, and suitable shapes are specifically disclosed in FIG. 31 of GB 2 256 164 A. Where there are weakened zones, the holes or zones can likewise be of any suitable shape, including the elongate shape of the grooves in GB 2 128 132 A. The ratio of the distance apart of the centres of adjacent holes to the width of the holes as measured along the line connecting the centres is preferably not less than about 1.15:1 or 1.4:1 or 1.5:1 and not greater than about 3:1, though this depends on the choice of plastics material.

The structures need not be uniform throughout, and the special arrangements shown in for instance GB 2 108 896 A or GB 2 034 240 A can be employed, or for instance, junctions can be consolidated as shown in FIGS. 7b and 7d of GB 2 295 353 A. However, the structure will normally extend substantially from edge to edge and end to end of the geogrid, and there will be a multiplicity of said tensile members in each said set. In general, in the uniax geogrids, it is preferred that the transverse bars are interconnected only by the angled strands, and in the biax geogrids that substantially all junctions (except for instance at the sides and ends of the geogrid) interconnect the same number of strands, preferably six. In the biax geogrid, it is preferred that tensile members of each set meet at substantially each junction.

The hexagons referred to preferably do not have any holes within the hexagon, other than parts of the holes delineating the shape of the hexagon. However, it is possible to place small holes in the centres of the hexagons so that small holes will be present in the centres of the junctions of the biaxial geogrids. Nonetheless, if the holes are too large, the geogrids of the invention will not be produced so that such small holes must be substantially smaller than the holes in the hexagonal array.

PREFERRED EMBODIMENTS

The invention will be further described by way of example, with reference to the accompanying drawings, in which.

Figure 1:
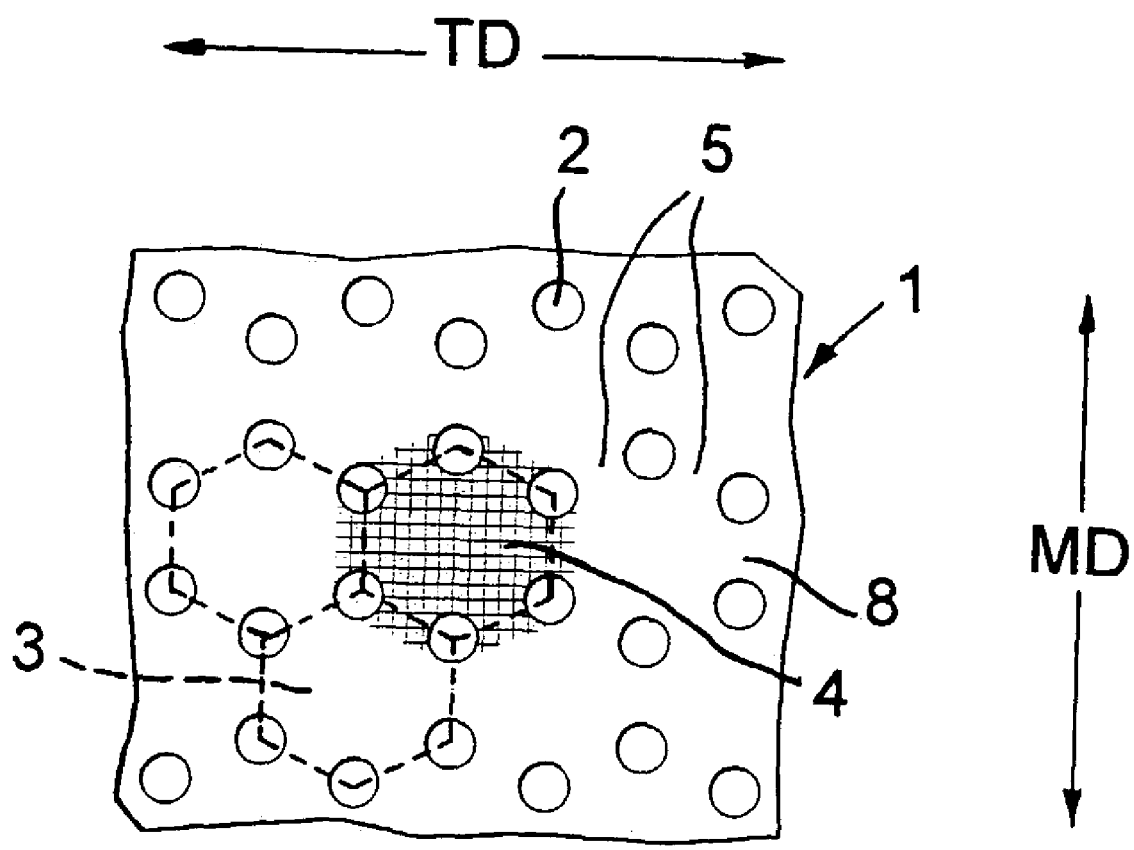
FIG. 1 is a plan view of a portion of a first starting material.
Figure 2:
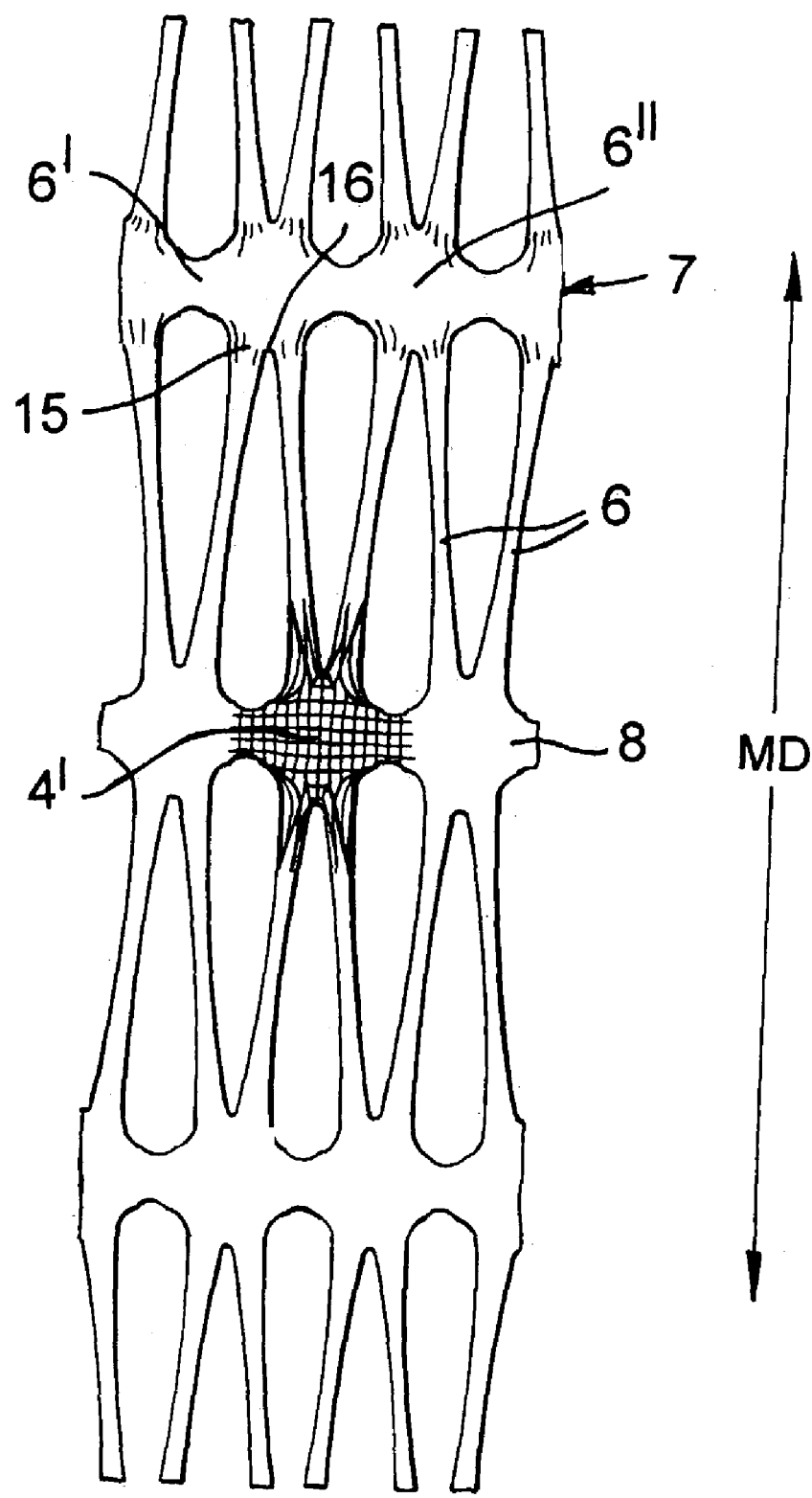
FIG. 2 is a plan view of the uniax geogrid made from the starting material of FIG. 1.
Figure 3:
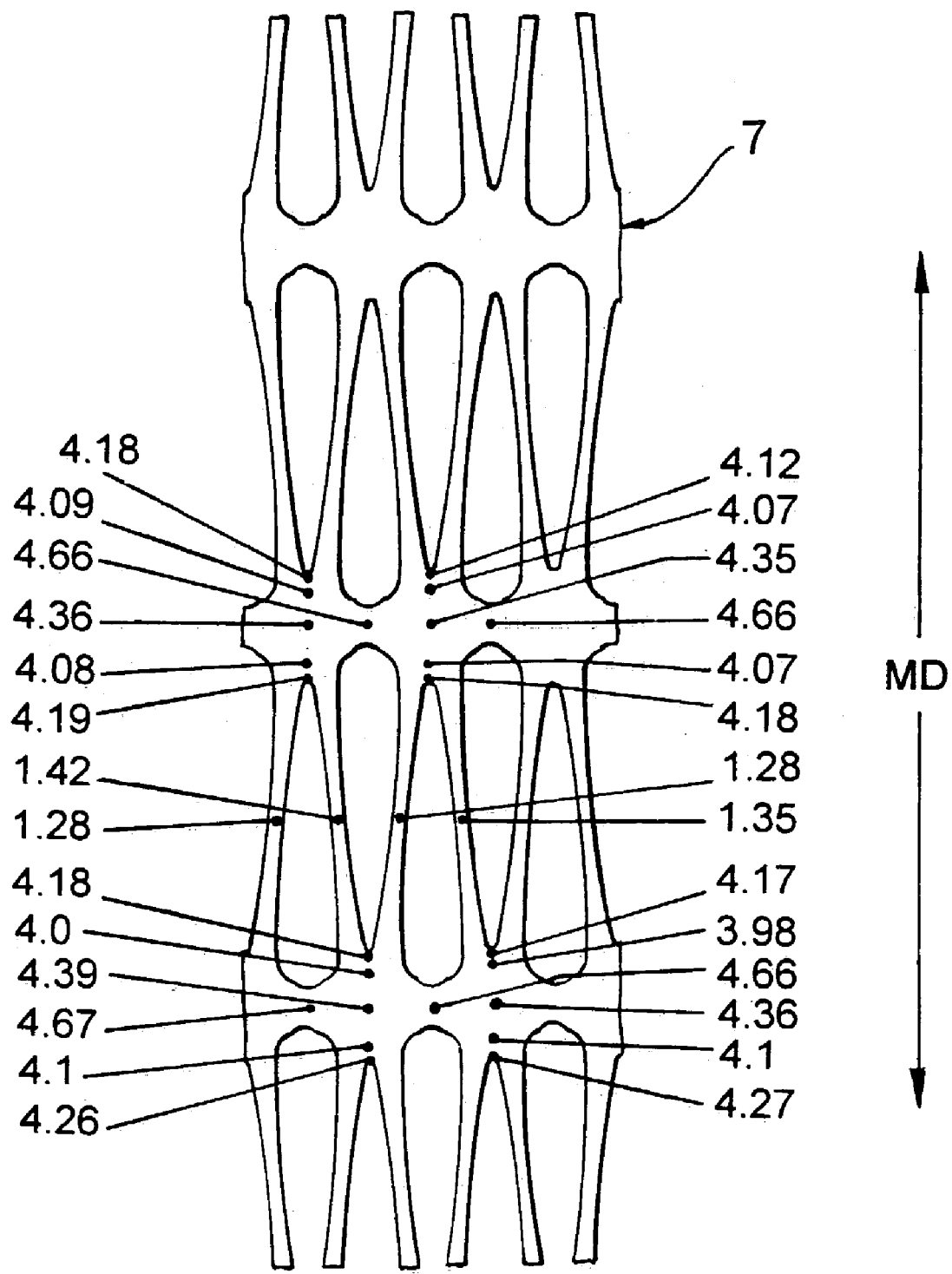
Figure 4:
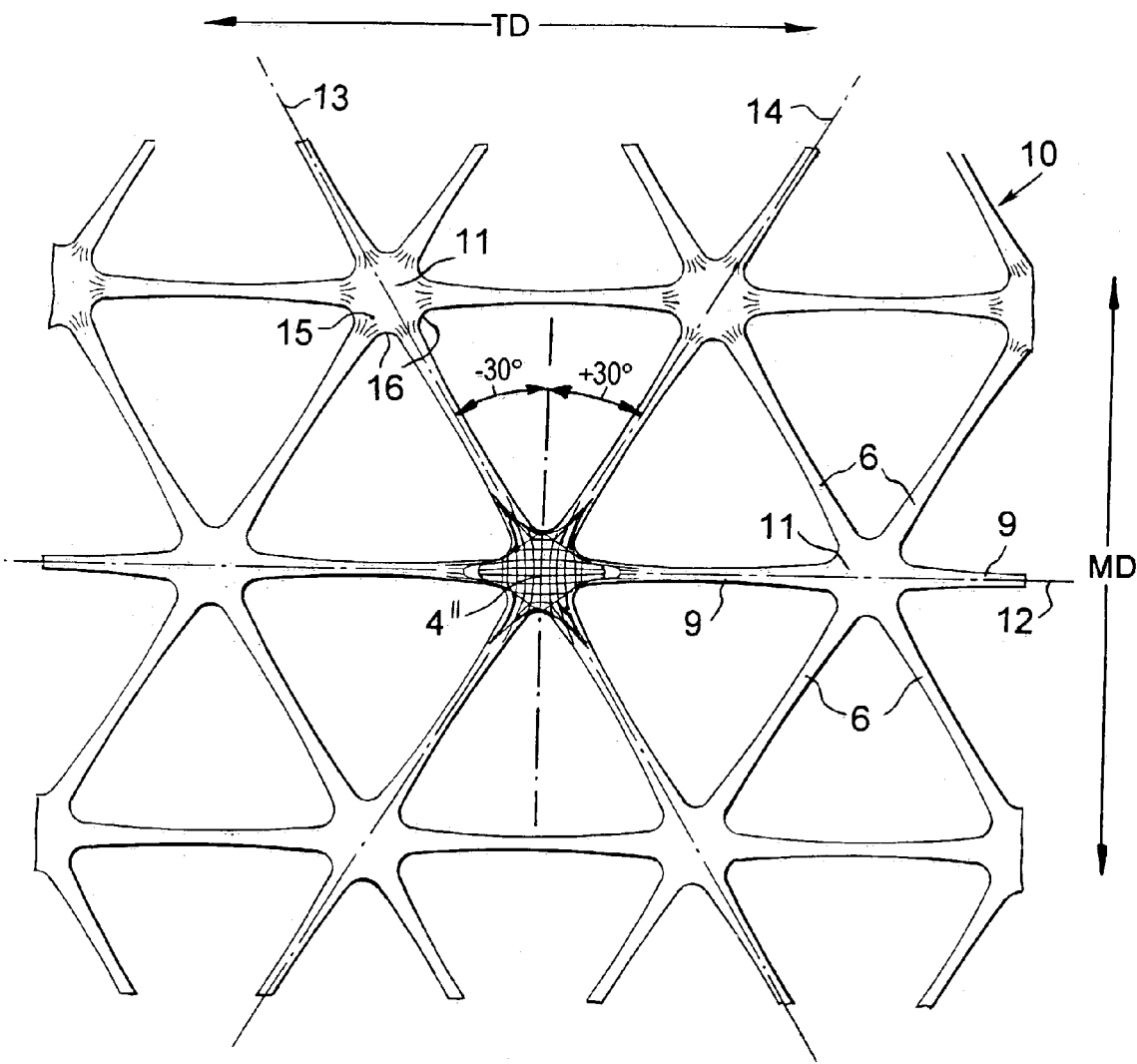
Figure 5:
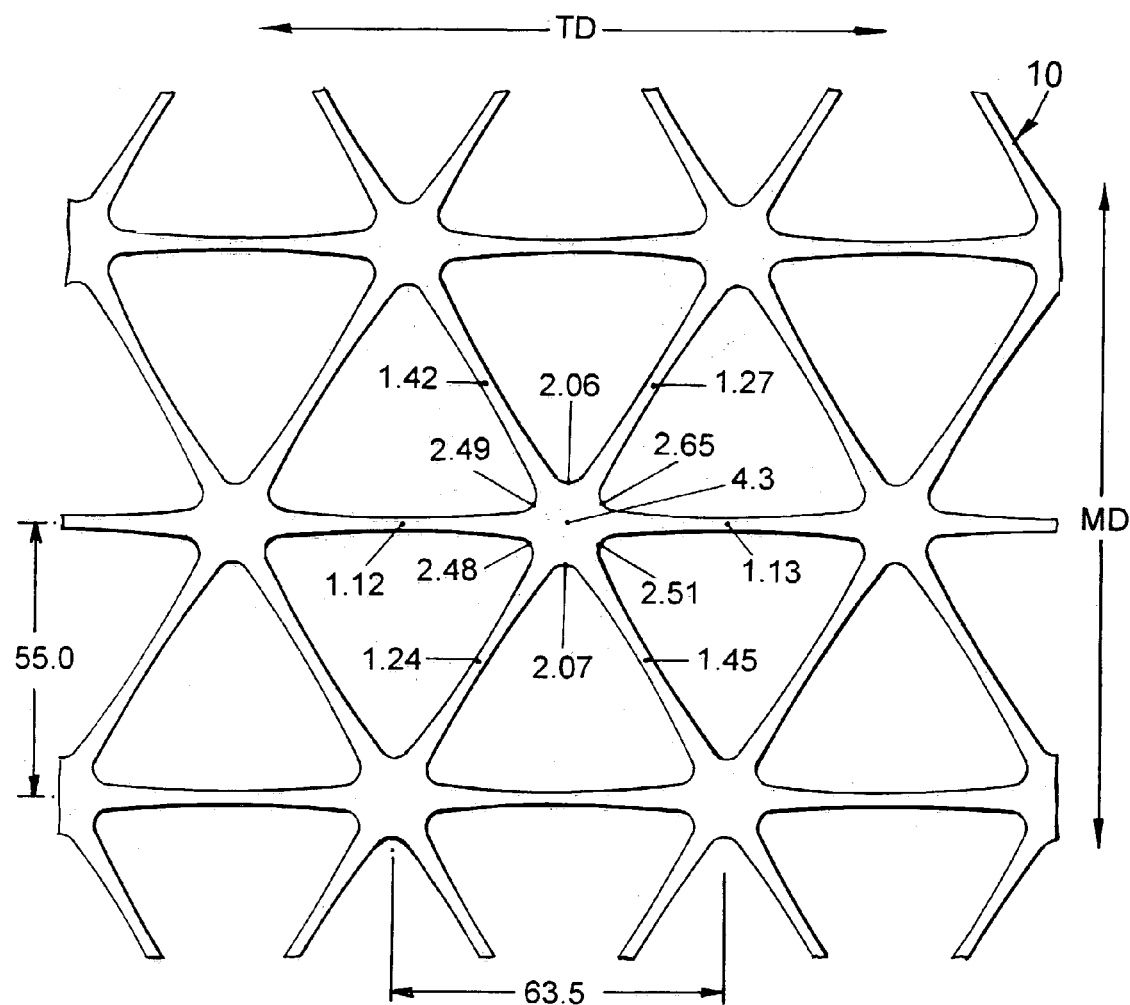
Figure 6:
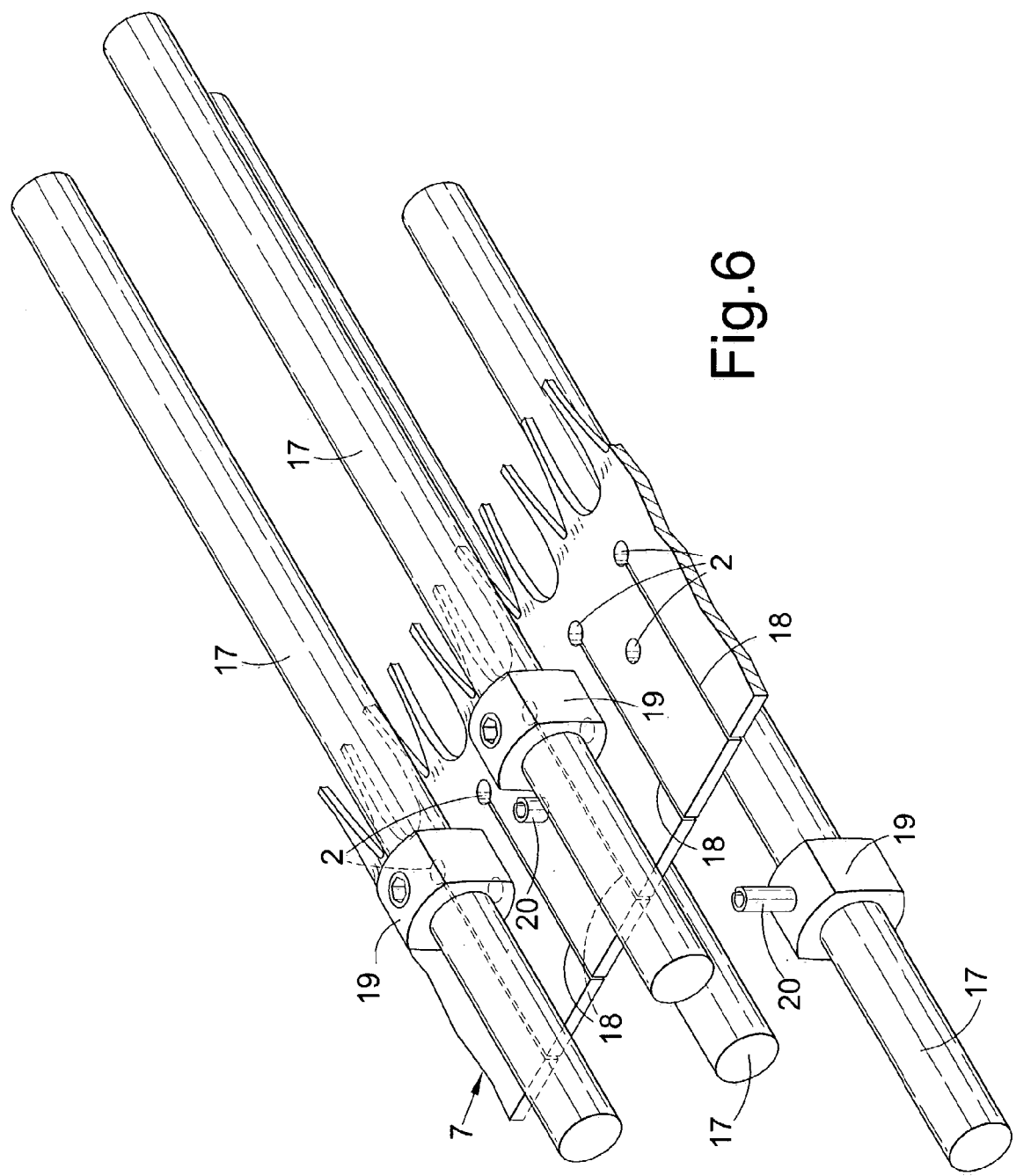
Figure 7:
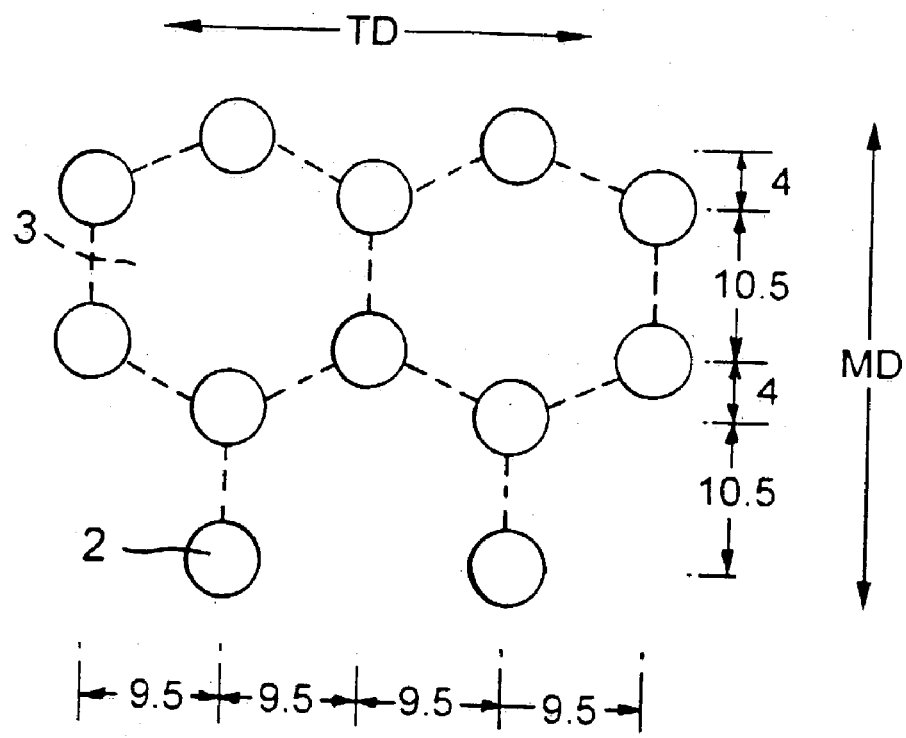
Figure 8:
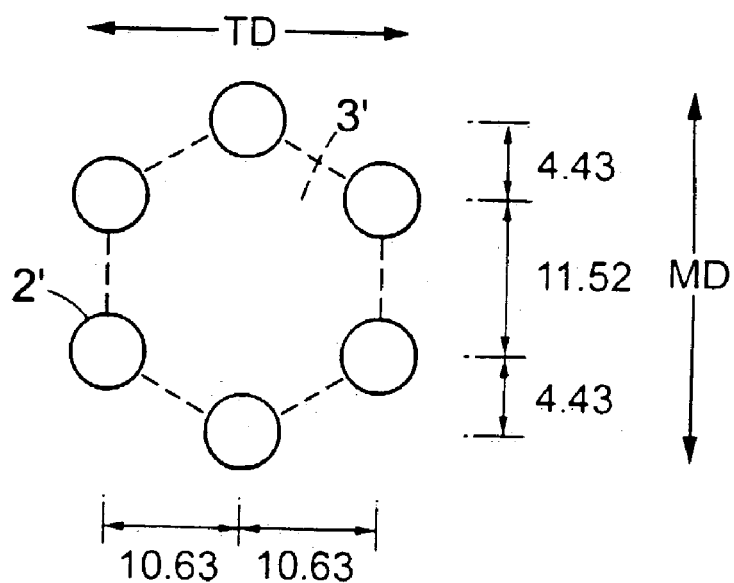
Figure 9:
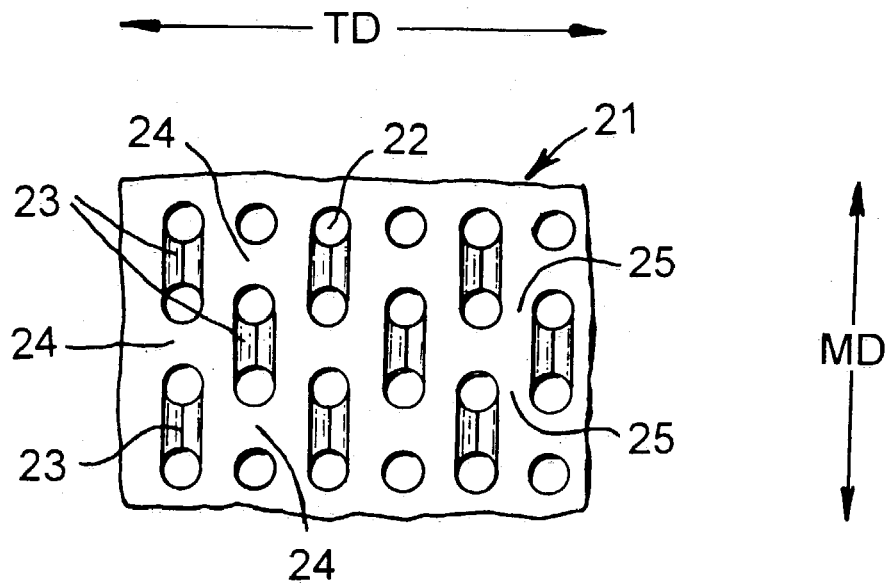
Figure 10:
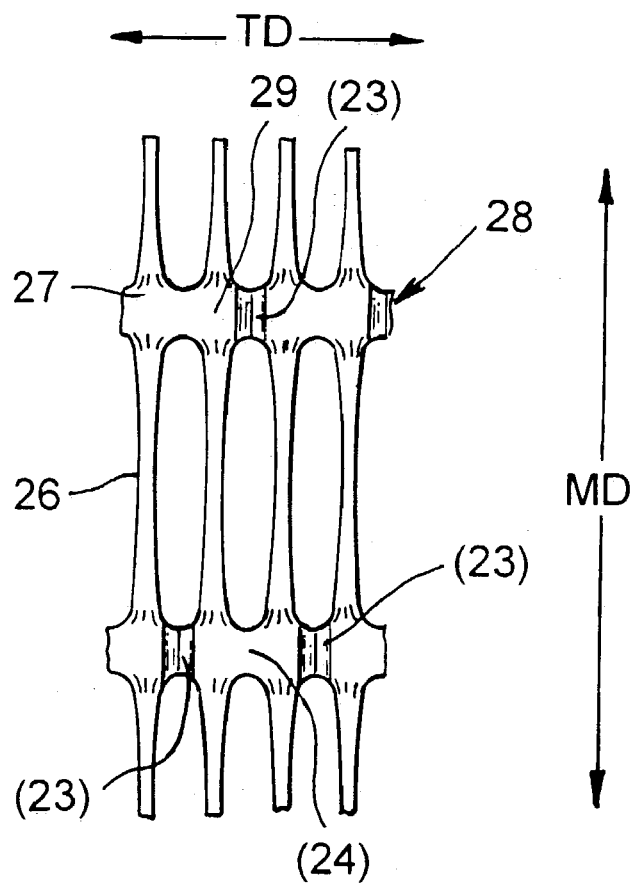
Figure 11:
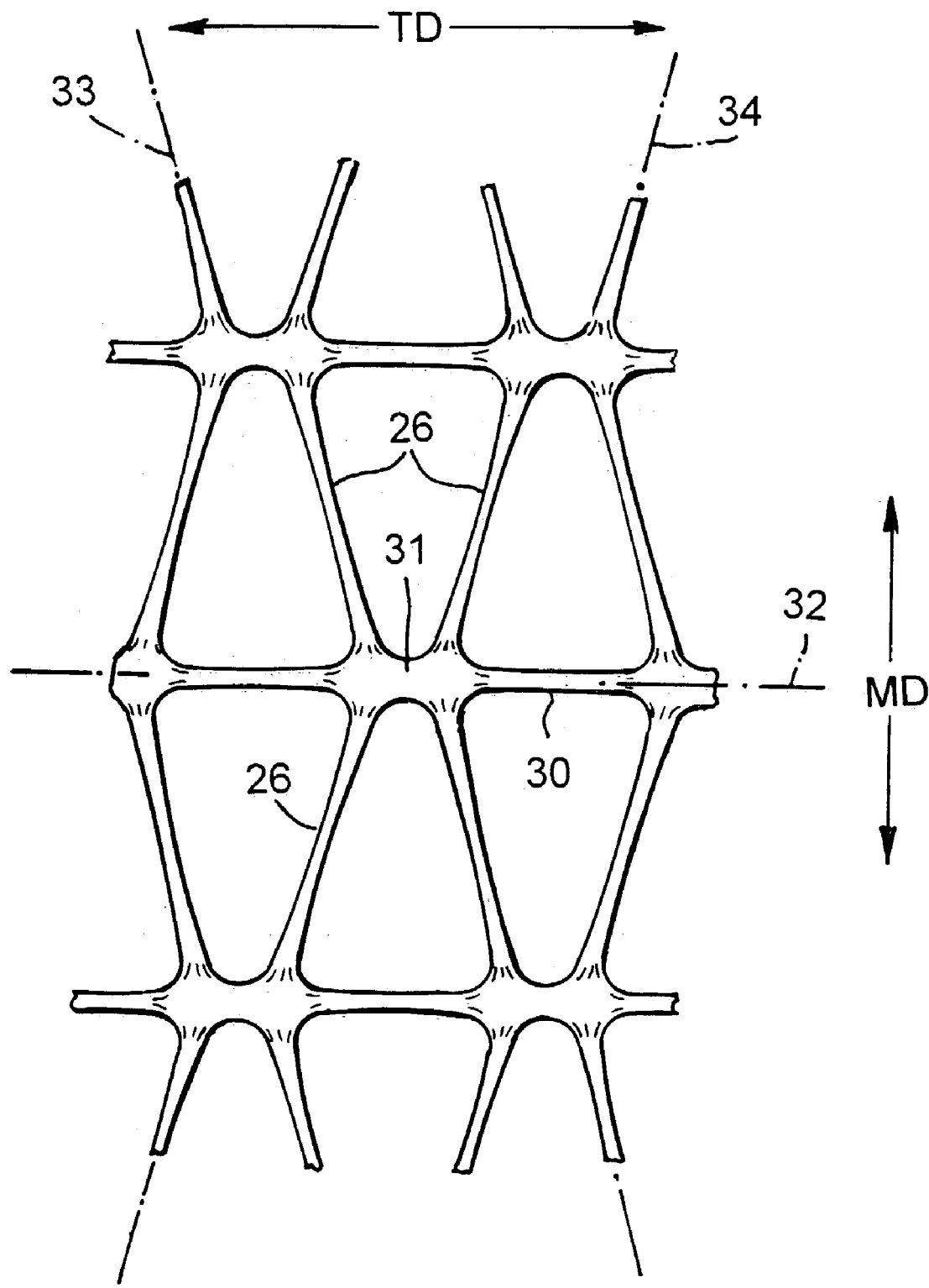
Figure 12:
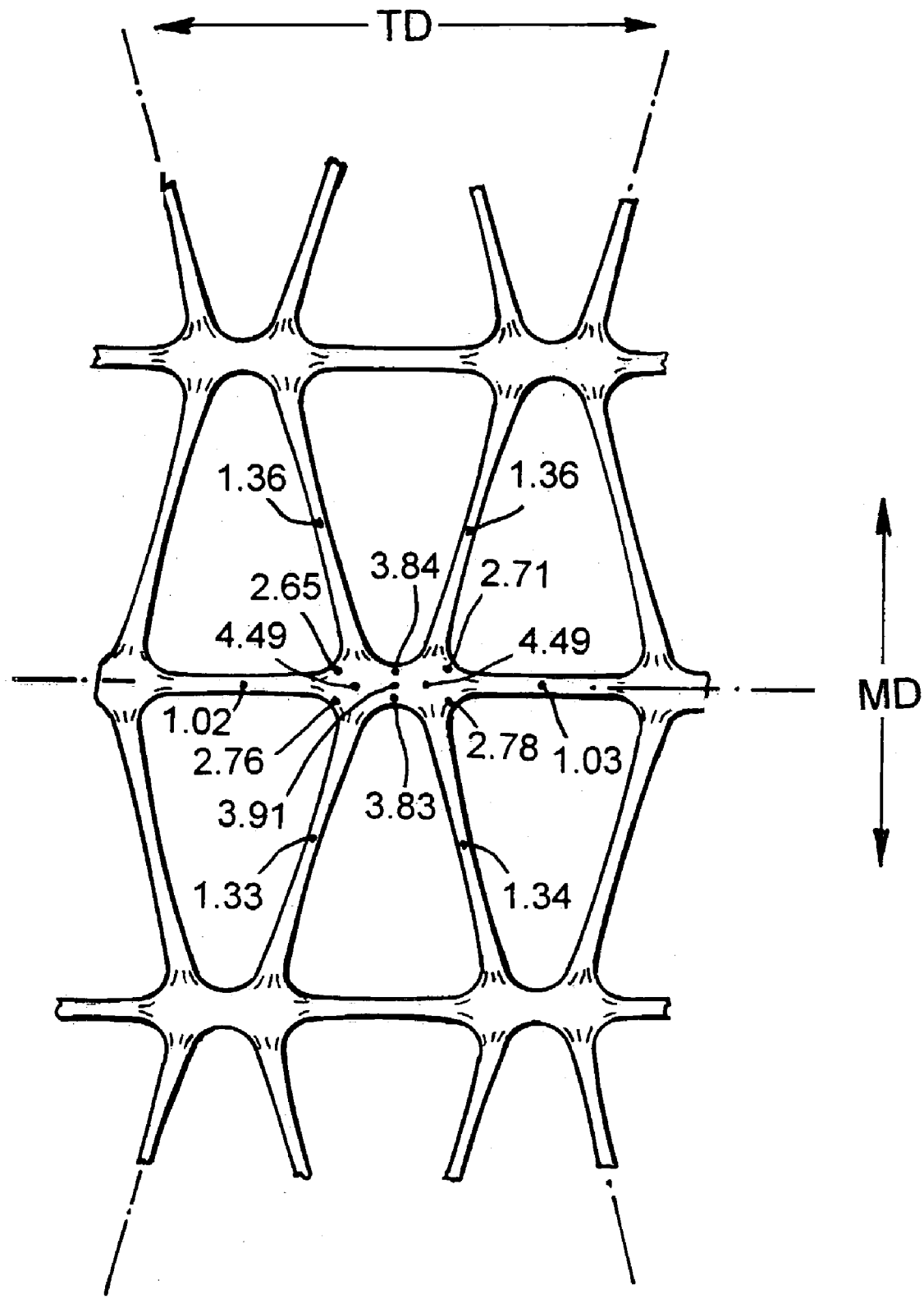
Figure 13:
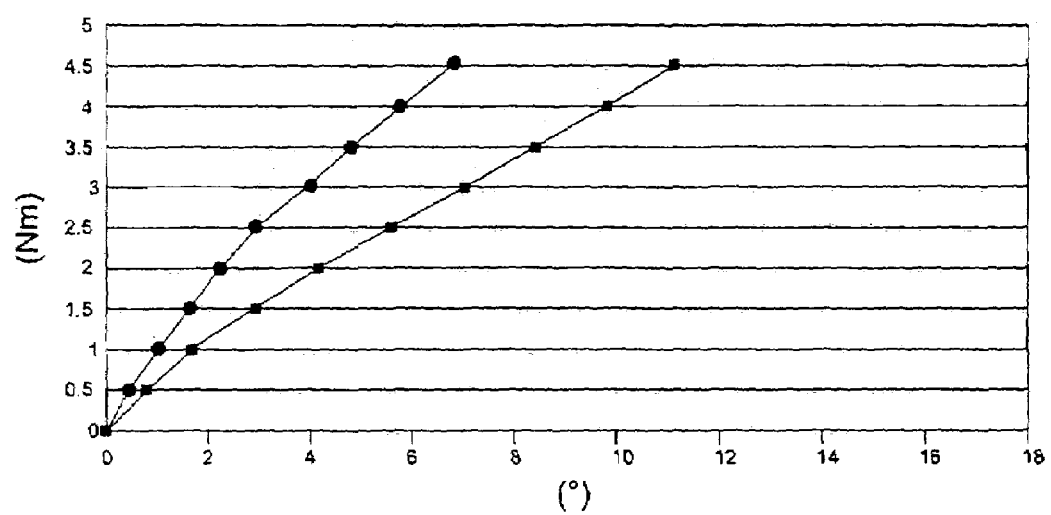
Figure 14:
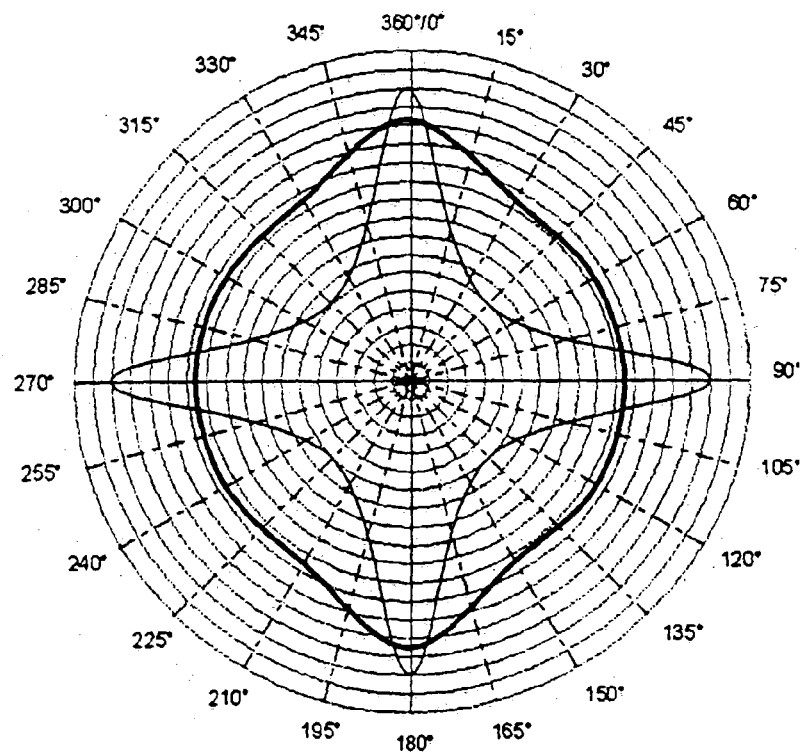
Figure 15:
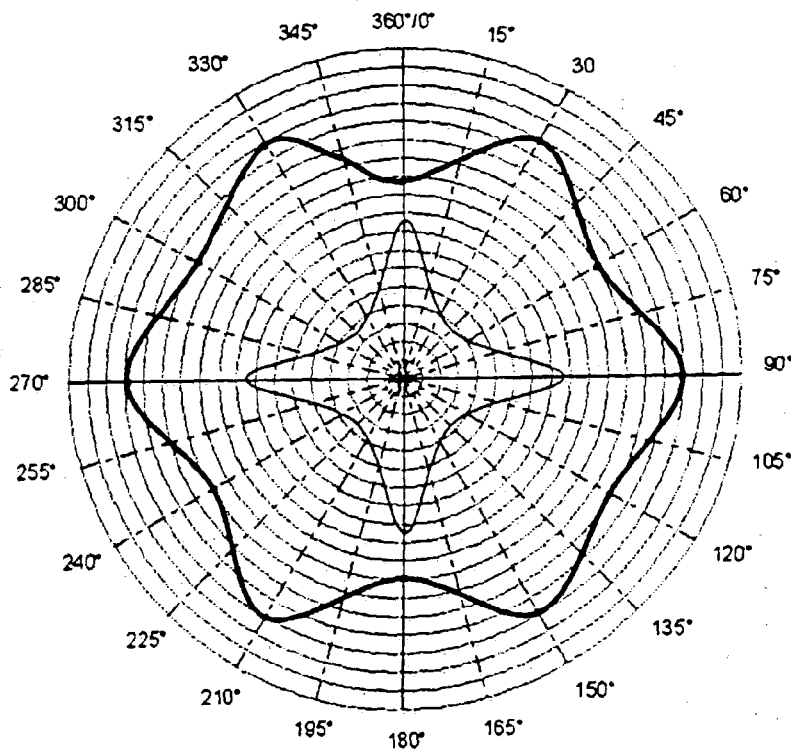
Figure 16:
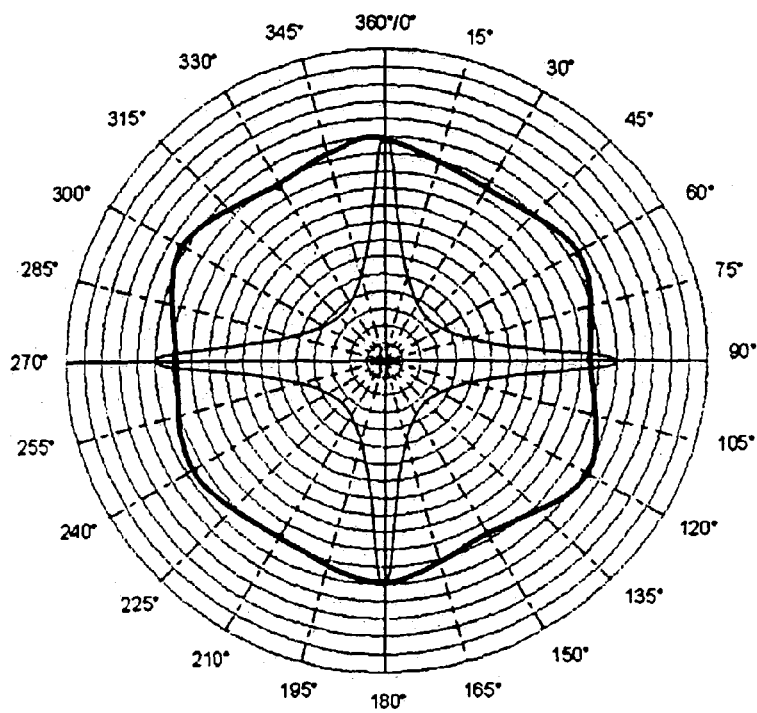
Figure 17:
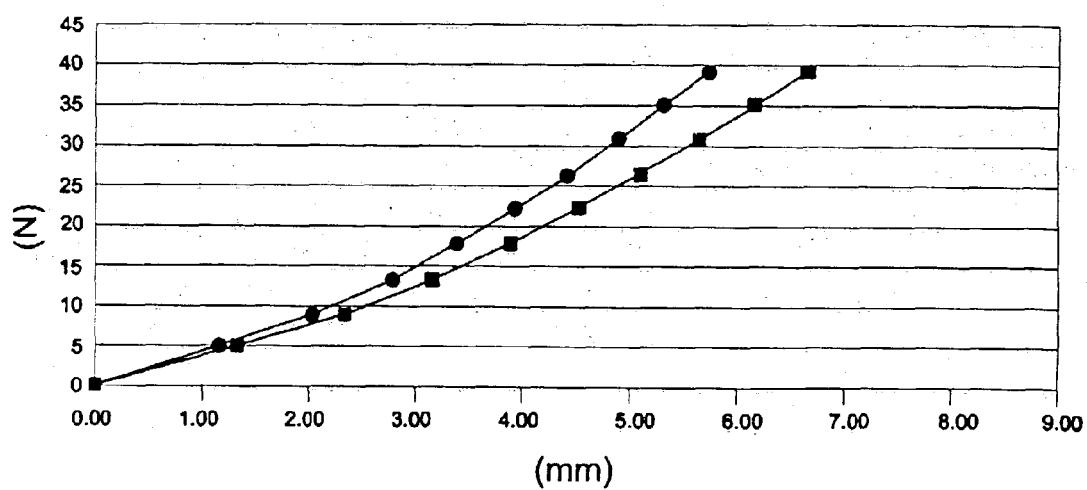

FIG. 3 corresponds to FIG. 2, but shows an example of the thicknesses of the uniax geogrid;

FIG. 4 is a plan view of the biax geogrid made from the starting material of FIG. 1;

FIG. 5 is the same as FIG. 4, but shows an example of the thicknesses of the biax geogrid;

FIG. 6 is an isometric view illustrating the use of restraining bars;

FIG. 7 shows the dimensions of the starting material in a first example;

FIG. 8 shows the dimensions of the starting material in a second example;

FIG. 9 is a plan view of a portion of a further starting material;

FIG. 10 is a plan view of the uniax geogrid made from the starting material of FIG. 9;

FIG. 11 is a plan view of the biax geogrid made from the starting material of FIG. 9;

FIG. 12 is the same as FIG. 11, but shows an example of the thicknesses of the geogrid;

FIG. 13 is a graph of the angular deflection (°) against torque (Nm) for an in-plane torsional rigidity test, for the biax geogrid of Example 2 (circular plots) and for a comparable conventional geogrid (square plots);

FIG. 14 is a polar diagram of the ultimate strength when tested at various angles, the outer circle representing a strength of 36 kN/m, the thick line representing the biax geogrid of Example 2 and the thin line representing a comparable, conventional biax geogrid;

FIG. 15 is a polar diagram corresponding to that of FIG. 14, but showing the secant modulus (stiffness) at maximum load, the outer circle representing 6 kN/m;

FIG. 16 corresponds to FIG. 14, but shows the grid strength at 2% strain, the outer circle representing a load of 18 kN/m; and FIG. 17 is a graph of deflection against force for the geogrid of Example 2 (circular plots) and for a comparable conventional biax geogrid (square plots) when a load is applied to a centre junction of a sample which is clamped all around its periphery.

FIGS. 1 TO 6—FIRST EMBODIMENT

In one procedure, the starting material 1 shown in FIG. 1 was a strictly uniplanar sheet of extruded plastics material having planar parallel faces. Holes 2 were punched in an array of hexagons 3 of substantially identical shape and size so that substantially each hole 2 was at a corner of each of three hexagons 3. For experimental purposes, truth lines 4 are shown printed on the central area of the portion of starting material 1 represented.

The starting material 1 was heated and a first stretch was applied in the notional MD, i.e. in a direction substantially parallel to the MD sides of the hexagons 3 indicated in FIG. 1, using parallel clamps which engage the edge zones of the starting material 1 and are then drawn apart linearly. Although simple clamps were used, the term MD and TD are used for convenience. Due to the strength configuration of the starting material 1, the first stretch stretched out strand-forming zones 5 between adjacent holes on the MD sides of the hexagons 3 to form oriented strands 6 from such zones 5 (see FIG. 2 which shows the uniax material 7), the strands 6 interconnecting oriented TD bars 6'. A comparison of the truth lines 4' shown in FIG. 2 with the truth lines 4 shown in FIG. 1 shows that the junction centres in the uniaxial material 7 of FIG. 2 had been slightly stretched out or oriented in the MD. As shown by the hatching lines in FIG. 2 (shown only in the top part of the Figure), the ends of the strands 6 slope upwards into the junctions, forming re-entrants at around point 15 and leaving a thick zone 16 in the crotch between adjacent strands 6. The strands 6 interconnect TD bars 6', the strands 6 extending at a substantial angle to the MD (about 5.5°) and alternate strands 6 across the width of the uniaxial geogrid 7 being angled to the MD by equal and opposite angles, there being no substantially MD strands. Between the locations 6" where the strands 6 meet the bar 6', the bar 6' is unoriented, and at the locations 6" the bar 6 is slightly oriented in the MD so that the orientation of the strands 6 extends across the bar 6' to the strands 6 on the other side of the bar 6'. The first (MD) stretch dictated the distance that will eventually become the dimension "across the flats" of the hexagon defined by the oriented strands in the final geogrid, i.e. the distance from the centre point of one oriented strand to the centre point of the oriented strand on the opposite side of the respective hexagon formed by the oriented strands in the geogrid.

The uniax geogrid 3 was then released from the clamps, the clamp position was adjusted and the geogrid 7 was turned through 90° and the other two edge zones engaged by the clamps. A notional "TD" stretch was then applied to the heated uniax material 7 to stretch out strand-forming zones 8 on the remaining sides of the hexagons 3, between adjacent holes 2 which are on the sides of the hexagons 3 parallel to the MD. The zones 8 formed oriented strands 9 (see FIG. 4 which shows the biax product or geogrid 10) while the strands 6 were swung into their final angled position and were further extended. As can be seen from FIG. 4, the centre portions of the original hexagons 3 formed junctions 11 each interconnecting six oriented strands, 6, 9 in a structure in which substantially each strand 6, 9 (each strand 6, 9 except at the sides and ends of the geogrid) has each end connected to a junction 11 and groups of three strands 6, 9 form triangular meshes with a junction 11 at each corner. As considered in the TD, alternate angled strands 6 are angled to the TD by equal and opposite angles. In the geogrid 10, there are three sets or series of substantially parallel tensile members running through the geogrid 10, as indicated by the chain-dotted lines 12, 13, 14, respectively in the TD, at −30° to the MD and at +30° to the MD. Each tensile member 12, 13, 14 is formed of a succession of substantially aligned strands 6 or 9 and respective junctions 11 connecting the strands 6 or 9.

As shown by the hatching lines in FIG. 4 (shown only in the top part of the Figure), each strand 6 or 9 forms a re-entrant 15 where it enters the junction 11 and the crotch 16 between adjacent strands 6 or 9 has been stretched out so that there is continuous orientation from the edge of one strand 6 or 9, around the crotch 16 and to the edge of the adjacent strand 6 or 9. The stretch ratio in the middle of the strands 6, 9 can be about 9:1, but in order to obtain as near as perfect 60° angles between the strands 6, 9, a slightly smaller stretch ratio must in general be applied to the TD strands 9 than to the angled strands 6. The reduction in thickness of the centres of the strands 6, 9 is about 75%, but with thicker starting sheets, more stretch can be applied to give the same percentage thickness reduction.

A comparison of the truth lines 4" of the biax product or geogrid 10 of FIG. 4 with the truth lines 4' of the uniaxial geogrid 7 of FIG. 2 shows that the centres of the junctions 11 have been very slightly stretched out or oriented in the TD and have been very slightly thinned down. Thus the junction centres have slight biaxial orientation. In general, there is preferably some reduction of the centres of the junctions 11, say up to a maximum of about 20% reduction in thickness, but the stretching should not erode all the way through the junction 11. Overstretching in the MD causes the two MD strands 9 to act as one and pull a single strand out of the junction 11 so that the junction 11 is eroded and an offset strand structure is produced. Overstretching in the TD erodes the junction 11 and produces an irregular hexagon in the biaxial geogrid.

It was found that the extra stretching of the angled strands 6 during the TD stretch can cause undesired distortion of the biax geogrid 10 when the clamps are released. On release of the clamps, the angled strands 6 relax (the geogrid 10 shortens somewhat in the MD) and the resolved TD shortening of the angled strands 6 is greater than the shortening of the TD strands 9 so that the TD strands 9 buckle. This can be avoided by allowing the geogrid 10 to relax in the MD before the clamps are removed. For the TD stretch, rigid restraining bars 17 were attached to each MD end portion of the uniax material 7 so that the uniax material 7 stretched in the TD but was restrained in the MD.

FIG. 6 shows an MD end portion of the uniax material 7. Due to the positioning of the clamps for the MD stretch, the last two rows of holes 2 are in material which is not stretched out. As shown, slits 18 are cut from the very end of the material 7 up to the second row of holes 2. The restraining bars 17 have slidable collars 19 which can be locked in place which carry projecting pins 20. The nearest restraining bar 17 is shown before attachment in order to reveal the arrangement of the collar 19 and pin 20. At the other end, the restraining bars 17 have similar collars 19 and pins 20, engaging the end portion of the material 7 in the same way. Every alternate restraining bar 17 can be above the material 7 and the other restraining bars 17 below the material 7, as shown, or all the restraining bar 17 can be above the material if there is enough space. When the TD stretch is applied, the restraining bars 17 move apart but remain substantially parallel, and prevent MD shortening of the material 7 as it becomes a biax geogrid 10.

Immediately after the TD stretch while the geogrid 10 was still hot, the MD end portions of the biax geogrid 10 were cut to release them from the restraining bars 17, and the centre part bowed in as the centre part shortened in the MD. The clamps were then released while the geogrid was still hot. There was no buckling of the TD strands 9.

If there is a wide distance between the clamps, uniformity of stretching the TD strand 9 can be improved by "grooving" the respective strand-forming zones 8 as described in GB 2 128 132A with the grooves extending in the MD between the two holes defining the sides of the strand-forming zone 8.

FIG. 7 and Example 1

FIG. 7 is an enlarged view of part of the starting material 1 of FIG. 1 and indicates the pitches (the distances between the centres) of the holes 2. The starting sheet 1 was nominally 4.7 mm thick polypropylene with 2% carbon black additive and the punch size for the holes 2 was 5 mm diameter. It will be seen that the hexagons 3 do not have equal-length sides but are slightly foreshortened in the MD and in each hexagon 3, the ratio of the distance between the centres of the two opposite holes 2 on the MD axis of the hexagon 3 (18.5 mm) to the distance between the other remaining pairs of opposite holes 2 (21.7 mm) is 0.85:1 (or 1:1.17). The major MD pitch:minor MD patch ratio is 2.625:1. The ratio of the distance apart of the centres of adjacent holes to the diameter of the holes is 2.1:1 and 2.06:1, respectively.

The starting material 1 was given a first (notional MD) stretch to an overall stretch ratio of 3.86:1, and was allowed to relax to give a stretch ratio of 3.79:1. This produced the uniax product 7 generally illustrated in FIG. 2 and of which one part is specifically illustrated in FIG. 3 with thicknesses at various points being indicated, in mm. The uniax product 7 of FIG. 2 was then given a second (notional TD) stretch (with MD restraint using the restraining bars 17 referred to above) to an overall stretch ratio of 3.4:1, and was allowed to relax to give a final TD stretch ratio of 3.34:1. This produced the biax geogrid generally illustrated in FIG. 4 and of which one part is specifically illustrated in FIG. 5 with thicknesses at various points and two other dimensions being indicated, in mm. The final junction centre junction centre distance in FIG. 5 is about 63.5 mm and the final overall stretch ratios are 3.79:1 and 3.34:1 in the MD and TD respectively. The mid-points of the junctions 11 have thinned down roughly 10% during the two stretches. 85% to 90% of the total stretch of the angled strands 6 was applied during the MD stretch, the remainder being applied during the TD stretch. The geometrical extension and relative lateral displacement were almost zero.

In each stretch, the stretching temperature was 120° C., and the stretching speed was up to 300 mm/min in the laboratory (much higher speeds would be used in production).

FIG. 8 and Example 2

FIG. 8 corresponds to FIG. 7, but the dimensions were different, as indicated in FIG. 8. The hexagons 3' have equal-length sides. The punch size for the holes 2' was again 5 mm diameter. The ratio of the distance apart of the centres of adjacent holes 2 to the width of the holes 2, as measured along the line connecting the centres, is 2.30:1. Other parameters were:

Starting sheet thickness—4.7 mm;
Major MD pitch: minor MD pitch—2.6:1;
MD distance between centre lines of adjacent bars 6' after the first stretch—60 mm.
TD junction centre/junction centre distance after first stretch (after relaxation)—21.3 mm;
TD junction centre/junction centre distance after second stretch (after relaxation)—69.3 mm;
Intermediate MD stretch ratio (before relaxation)—3.82:1;
Intermediate TD stretch ratio (before relaxation)—3.31:1 (including relaxation allowance);
Final MD stretch ratio (after relaxation)—3.76:1;
Final TD stretch ratio (after relaxation)—3.26:1;
Final biax geogrid weight—332 gm$^2$;
Aperture size in final biax geogrid—just sufficient to allow a 37 mm diameter sphere to pass through.
Geometrical extension and relative lateral displacement—almost zero.

In both the MD and TD stretch operations, slight overstretching was performed to permit some relaxation in the geogrid before it attained the correct final dimensions.

Samples of approximate dimensions 350 mm×350 mm with an intersection in the centre were clamped all around their peripheries using a square clamp. The four (comparable conventional biax geogrid) or six (the invention) strands radiating from the centre intersection were clamped as close as possible to the junction 11. The centre clamp was rotated relative to the perimeter clamp in order to determine in-plane torsional rigidity. FIG. 12 represents the results. The torsional modulus can be derived as 0.65 Nm/°. This result is approximately 65% higher than the result for a comparable conventional biax geogrid is tested under the same conditions.

FIGS. 14 to 16 are polar diagrams, representing the ultimate strength, the secant modulus at maximum load, and the strength at 2% strain of the geogrid of Example 2. In the polar diagrams, the 0° axis is the notional MD.

In FIGS. 14 to 16, the response of the comparable conventional biax geogrid is characterised by four distinct peaks, at 0°, 90°, 180° and 270°, corresponding to the notional MD and TD. FIG. 14 shows that in the MD and TD directions, the ultimate strength of the biax geogrid of Example 2 is less than that of the comparable conventional biax geogrid, but the ultimate strength of the biax geogrid of Example 2 at the intermediate angles is much greater than that of the comparable conventional biax geogrid. The larger ultimate strength of the biax geogrid of Example 2 in the MD than that in the TD is thought to be due to the higher stretch ratio in the MD compared to the stretch ratio in the TD so that the angled strands are stronger than the TD strands (in all test directions, at least one angled strand is involved and in the MD two angled strands are involved). In FIG. 15, there are peaks of the secant modulus of the biax geogrid of Example 2 in directions aligned with the strands. FIG. 16 indicates the lower strength of the biax geogrid of Example 2 in all directions aligned with the strands. In the 0° and 180° directions, the strength is the same as for the comparable conventional biax geogrid, and is only slightly less in the 90° and 270° directions.

Apart from the multi-directional property characteristics of the biax geogrid of Example 2 illustrated in FIGS. 14 to 16, the total property potential may be compared by considering the areas within the respective curves. For FIG. 13, the area within the curve for the biax geogrid of Example 2 is approximately 70% greater than that within the curve for the comparable conventional biax geogrid. The corresponding values for FIGS. 15 and 16 are about 400%.

FIG. 17 shows the deflection of the biax geogrid of Example 2 compared to that of a comparable conventional biax geogrid. The sample size was 350 mm×350 mm and the periphery of the sample was clamped as above. However, a load normal to the plane of the sample was applied to the centre intersection and the deflection measured. The biax geogrid of Example 2 is stiffer than that of the conventional biax geogrid.

FIGS. 9 to 11—Second Embodiment

In a laboratory test, the starting material 1 shown in FIG. 9 was a strictly uniplanar sheet of extruded plastics material having planar parallel faces. Holes 22 were punched on a rectangular grid whose axes extend in the notional MD and in the notional TD. By employing grooving (forming depressions without material removal when the plastics material is at a temperature below the lower limit of its melting range—there is a description of grooving in GB 2 128 132 A) weakened zones 23 were formed between alternate pairs of adjacent holes in each MD row, the weakened zones 23 being staggered as between adjacent MD rows so that a weakened zone 23 in one MD row was adjacent a non-weakened zone 24 in the adjacent MD rows on either side. The grooving was applied using a tool having inclined faces and a radiused end, like a chisel point, and extended from one hole 22 to the adjacent hole, the grooving being applied while the starting material 21 was cold.

A first stretch was applied in the MD, and stretched out zones 25 between adjacent holes 22 in each TD row to form oriented strands 26 from such zones 25, the strands 26 interconnecting TD bars 27 (see FIG. 11 which shows the uniax material 28). In the TD bars 27, between the locations 29 where the strands 26 meet the bar 27, the bar 27 was unoriented, and at the locations 29, the bar 27 was slightly oriented in the MD so that the orientation of the strands 26 extended across the bar 27 to the strands 26 on the other side of the bar.

A TD stretch was then applied to the uniaxial material 28, to stretch out the weakened zones 23 to form oriented strands 30 without stretching out the non-weakened zones 24 to the same extent as the weakened zones 23 were stretched. In this way, the non-weakened zones 24 formed junctions 31 each of which interconnects six of the oriented strands 26, 30 and forming a structure generally as in FIG. 4, though the diagonal strands 26 are offset at the junctions 31 because the junctions 31 are extended in the TD. The axes of the angled strands 26 are at about 14° to the MD. Each junction 31 has two thicker zones interconnected by a thinner zone (see the example of FIG. 12). At the centre points of the strands 30, the weakened zones 23 had a reduction in thickness of about 78% whilst at the centre points of the junctions 31, the non-weakened zones had a reduction in thickness of about 17%, the former reduction being about 4.6 or 4.65 times the latter. In practice, the tensile members formed by the diagonal strand 26, junction 31, diagonal strand 26, and so in sequence are effectively rectilinear because on applying tensile stress throughout the length, the "give" in the structure is negligible. There is some rotation of the junctions 31 but they are restrained by the remainder of the structure.

FIG. 12 and Example 3

The starting sheet thickness, material and punch size were as in Example 1. The notional MD pitch was 10.5 mm and the notional TD pitch 9.5 mm. The punch to form the grooves 23 had a 116° included angle with a radiussed tip, and was applied to each face of the material 21 to a depth of 16% of the sheet thickness, giving a total grooving of 32% of the sheet thickness. The MD and TD stretch ratios were respectively 4.00:1 and 2.21:1. FIG. 12 indicates the thicknesses of various points on the product, in mm. The geometrical extension was 2.3%. The relative lateral displacement was 11.8%.

General

Unless the context clearly requires otherwise, throughout the description and the claims, the words "comprise" and the like are used in an inclusive as opposed to an exclusive or exhaustive sense, that is to say, in the sense of "include, but not limited to".

The present invention has been described above purely by way of example, and modifications can be made, within the spirit of the invention.

The invention claimed is:

1. A geogrid made by stretching and uniaxially orienting a plastics starting material which was provided with an array of holes, the geogrid comprising transverse bars interconnected by substantially straight oriented strands, at least some of the strands extending from one bar to the next at a substantial angle to the direction at right angles to the bars and alternate such angled strands across the width of the geogrid being angled to said direction by equal and opposite angles, the orientation of the angled strands extending into the bars.

2. The geogrid of claim 1, wherein said bars are interconnected only by oriented strands which do not extend in a direction at right angles to the bars.

3. The geogrid of claim 2, wherein the strands of each pair of adjacent angled strands meet immediately adjacent the respective bar.

4. The geogrid of claim 1, wherein between the locations where the strands meet the bar, the bar is unoriented, and at to locations where the strands meet the bar, the bar is slightly oriented in a direction at right angles to the bars so that the orientation of the strands extends across the bar to the respective strands on the other side of the bar.

5. The geogrid of claim 4, wherein between the locations where the strands meet the bar, the bars have a structure which is similar right across the geogrid.

6. A method of strengthening a particulate material, comprising embedding in the particulate material the geogrid of claim 1.

7. A geoengineering construction comprising a mass of particulate material strengthened by embedding therein a geogrid as claimed in claim 1.

8. The geogrid of claim 1, wherein the orientation of each said angled strand extends generally in the direction of stretching across the respective bar to the respective said angled strand on the other side of the bar, the bars having respective centre lines and the orientation at the bar centre line being substantially less than the orientation of said angled strands.

9. A geogrid made by stretching and uniaxially orienting a plastics starting material which was provided with an array of holes, the geogrid comprising transverse bars interconnected by substantially straight oriented strands, and wherein between the locations where the strands meet the bar, the bars are alternatively weakened and not weakened, the weakened zones in the bars adjacent to the first-mentioned bars being staggered so that a weakened zone in one bar is aligned with respective non-weakened zones in the adjacent bars.

10. A geogrid made by stretching and biaxially orienting a plastics starting material which was provided with an array of holes, the geogrid comprising:
a first set of substantially straight oriented strands extending at an acute angle to a first direction;
a second set of substantially straight oriented strands extending at an acute angle to the first direction and, as considered in a second direction at right angles to the first direction, alternate (angled) strands of the two sets being angled to the first direction by substantially equal and opposite angles;
further substantially straight oriented strands extending in said second direction; and
junctions each interconnecting four of the angled oriented strands and two of the further oriented strands, at substantially each junction the crotch between each pair of adjacent strands being oriented in the direction running around the crotch, whereby there is continuous orientation from the edge of one strand, around the crotch and to the edge of the adjacent strand.

11. The geogrid of claim 10, wherein there are no oriented strands which extend substantially in the first direction.

12. The geogrid of claim 10, wherein there are only two said sets, whereby triangular mesh openings are formed by the angled strands and by the further strands.

13. The geogrid of claim 10, wherein the junctions comprise two thicker zones each connecting two angled strands and a further strand, and a thinner zone interconnecting the two thicker zones.

14. The geogrid of claim 10, wherein the angle between the axis of each angled strand and the first direction is between about 10° and about 20°.

15. The geogrid of claim 10, wherein the angle between the axis of each angled strand and the first direction is about 30°.

16. The geogrid of claim 10, wherein the first direction is the machine direction.

17. The geogrid of claim 10, wherein the angled strands and the further strands provide three sets of spaced, parallel, effectively rectilinear continuous tensile members which extend through the geogrid and each of which comprises an oriented strand, a junction, an oriented strand, a junction, and so on, each junction interconnecting respective strands of the tensile member and the strands of the tensile member being substantially aligned with each other, each junction functioning as a junction for a tensile member of each of the sets, a tensile member of each of the sets intersecting at each junction.

18. The geogrid of claim 17, wherein said plastics starting material has a minimum thickness of 2.0 mm.

19. The geogrid of claim 18, wherein said plastics starting material has a minimum thickness of 4.7 mm.

20. A method of strengthening a particulate material, comprising embedding in the particulate material the geogrid of claim 10.

21. A geoengineering construction comprising a mass of particulate material strengthened by embedding therein a geogrid as claimed in claim 10.

22. A method of making a uniaxially oriented plastics material geogrid, comprising:
providing a plastics sheet starting material which has holes in an array of hexagons of substantially identical shape and size so that substantially each hole is at a corner of each of three hexagons, there being within the hexagon no holes of a size greater than or equal to the size of the first mentioned holes; and applying a stretch to stretch at strand-forming zones between adjacent holes on sides of the hexagons and form oriented strands from such zones, thereby forming a structure having bars at right angles to the direction of stretch, interconnected by the oriented strands, the stretch being applied to such an extent that the orientation of the strands extends into the bar.

23. The method of claim 22, wherein the stretch is applied to such an extent that the orientation of the strands extends across the bar to the respective strands on the other side of the bar.

24. The method of claim 22, wherein said stretch is applied to such an extent that the orientation of each said strand extends generally in the direction of stretching across the respective bar to the respective said strand on the other side of the bar, the bars having respective centre lines and the orientation at the bar centre line being substantially less than the orientation of said strands.

25. The method of claim 22, wherein said stretch is applied to such an extent that between locations where the strands meet the bar, the bar is unoriented, and at the locations where the strands meet the bar, the bar is slightly oriented in a direction at right angles to the bars so that the orientation of the strands extends across the bar to the respective strands on the other side of the bar.

26. A method of making a biaxially oriented plastics material geogrid, comprising:
providing a plastics sheet starting material which has holes in an array of hexagons of substantially identical shape and size so that substantially each hole is at a corner of each of three hexagons, there being within the hexagon no holes of a size greater than or equal to the size of the first-mentioned holes;
applying a stretch in a first direction to stretch out strand-forming zones between adjacent holes on sides of the hexagons and form oriented strands from such zones; and
applying a stretch in a second direction substantially at right angles to said first direction to stretch out strand-forming zones between adjacent holes on the sides of the hexagons and form oriented strands from the latter zones, whereby centre portions of the hexagons form junctions interconnecting the oriented strands, the stretching being applied to such an extent that the orientation of the strands extends into substantially each junction so that at substantially each junction, the crotch between each pair of adjacent strands is oriented in the direction running around the crotch, whereby there is continuous orientation from the edge of one strand, around the crotch and to the edge of the adjacent strand.

27. The method of claim 26, wherein the stretch in the first direction is applied in a direction substantially parallel to two sides of the hexagons, to stretch out zones between adjacent holes on the remaining four sides of the hexagons, and the stretch in the second direction stretches out zones between adjacent holes on the sides parallel to the first direction.

28. The method of claim 26, wherein said stretch in said second direction is not before said stretch in said first direction, and during said stretch in said second direction, restraint is applied to the material in said first direction, and after the second stretch, before the material is allowed to relax in the said second direction, said restraint is discontinued.

29. The method of claim 26, wherein each hexagon is substantially symmetrical about an axis which extends in said direction of stretch or in said first direction.

30. The method of claim 26, wherein each hexagon is arranged so that two opposite holes delineating the hexagon are substantially aligned in the said direction of stretch or in said first direction, and the stretch in said direction of stretch or in said first direction is applied in a direction substantially parallel to two sides of the hexagons, to stretch out zones between adjacent holes on the remaining four sides of the hexagons.

31. The method of claim 26, wherein the sides of the hexagons are all substantially equal, as measured between the centres of the respective holes.

32. The method of claim 31, wherein the oriented strands which are formed in said second direction of stretch are stretched out to a lower stretch ratio than the oriented strands which are formed in said first direction of stretch so that the latter oriented strands extend at substantially 60° to the former oriented strands.

33. The method of claim 26, wherein the vertices of the hexagons are aligned in the stretch direction or first stretch direction, and the vertex pitch of each hexagon is less than the diagonal pitch.

34. The method of claim 33, wherein the ratio of the major pitch of the hexagon to the minor pitch of the hexagon is about 2.1:1 to about 3.2:1.

35. The method of claim 33, wherein the ratio of the major pitch of the hexagon to the minor pitch of the hexagon is about 2.6:1.

36. The method of claim 26, wherein said plastics sheet starting material has a minimum thickness of 2.0 mm.

37. The method of claim 36, wherein said plastics sheet starting material has a minimum thickness of 4.7 mm.

38. A method of making a plastics material mesh structure, comprising:
providing a plastics sheet starting material which has holes in a regular pattern, which holes define potential strand-forming zones extending between respective holes and which on stretching the starting material in one direction would stretch out to form oriented strands;
forming depressions in and thereby weakening some but not all said potential strand-forming zones without material removal when the plastics material is at a temperature below the lower limit of its melting range, said depressions defining a regular pattern, wherein in said one direction, said depressions are formed in every other potential strand-forming zone; and
applying a stretch in said direction so that the weakened potential strand-forming zones form oriented strands but the non-weakened potential strand-forming zones do not form oriented strands though some stretch may be applied thereto and whereby the mesh structure so produced is not that that would be produced from the starting material without said depressions.

39. The method of claim 38, wherein the starting material is also stretched in a direction at right angles to said one direction, to form oriented strands from further respective potential strand-forming zones.

40. The method of claim 39, wherein no said depressions are formed in the respective potential strand-forming zones for the second-mentioned direction stretch, whereby said potential strand-forming zones which have not been formed with depressions form extended junctions between said oriented strands.

41. The method of claim 39, wherein stretching in said one direction is the second stretch, following stretching in said second-mentioned direction.

42. A method of making an oriented plastics material geogrid, comprising:
provoking a plastics sheet starting material which has holes on a rectangular grid whose axes extend in a first direction and in a second direction substantially at right angles to the first direction, thereby providing first rows of holes extending in the first direction and second rows of holes extending in the second direction, and which starting material has weakened zones between alternate pairs of adjacent holes in each first row, the weakened zones being staggered as between adjacent first rows so that a weakened zone in one first row is adjacent a non-weakened zone in the adjacent first row on either side;
applying a stretch in the first direction to stretch out strand-forming zones between adjacent holes in each second row to form oriented strands from such zones; and
applying a stretch in the second direction to stretch out the weakened zones to form oriented strands from the weakened zones without stretching out non-weakened zones between adjacent holes of the first rows to the same extent as the weakened zones are stretched;
whereby the non-weakened zones form junctions each of which interconnects six of the oriented strands.

43. A geogrid made by the method of claim 42.

44. A method of making biaxially oriented plastics material mesh structure which has oriented strands which extend at an angle other than 90° to the first and second direction of stretch, comprising:
providing a plastics sheet starting material which has holes in a regular array;
applying a stretch in a first direction to stretch out respective strand-forming zones between adjacent holes and form oriented strands from such strand-forming zones;
applying a stretch in a second direction substantially at right angles to said first direction to stretch out other respective strand-forming zones between adjacent holes and form further oriented strands from the latter strand-forming zones, whilst applying restraint to the material in the first direction;
subsequently discontinuing said restraint; and
subsequently allowing the material to relax in the second direction.

45. A mesh structure made by the method of claim 44.

46. A method of making a biaxially oriented plastics material geogrid, comprising:
providing a plastics sheet starting material which has holes in an array of hexagons of substantially identical shape and size so tat substantially each hole is at a corner of each of three hexagons, there being within the hexagon no holes of a size greater than or equal to the size of the first-mentioned holes, the vertices of the hexagons being aligned in a first direction, the vertex pitch of each hexagon being less than the diagonal pitch;
applying a stretch in the first direction to stretch out strand-forming zones between adjacent holes on sides of the hexagons and form first and second oriented strands from such zones, the first and second oriented strands extending in different directions to each other; and
applying a stretch in a second direction substantially at right angles to the first direction to stretch out strand-forming zones between adjacent holes on the sides of the hexagons and form third oriented strands from the latter zones, whereby centre portions of the hexagons form junctions interconnecting the oriented strands and triangular meshes are formed each by a first oriented strand, a second oriented strand and a third oriented strand, the first oriented strands entering a junction being substantially aligned and the second oriented strands entering a junction being substantially aligned.

47. The method of claim 46, wherein the ratio of the major pitch of the hexagon to the minor pitch of the hexagon is about 2.1:1 to about 3.2:1.

48. The method of claim 46, wherein the ratio of the major pitch of the hexagon to the minor pitch of the hexagon is about 2.6:1.

49. The method of claim 46, wherein said stretch in said second direction is not before said stretch in said first direction, and during said stretch in said second direction, restraint is applied to the material in said first direction, and after the second stretch, before to material is allowed to relax in the said second direction, said restraint is discontinued.

50. The method of claim 46, wherein stretching is applied to such an extent that the orientation of the strands extends into substantially each junction so that at substantially each junction, the crotch between each pair of adjacent strands is oriented in the direction running around the crotch, whereby there is continuous orientation from the edge of one strand, around the crotch and to the edge of the adjacent strand.

51. A geogrid made by the method of claim 46.

52. The method of claim 46, wherein said plastics sheet starting material has a minimum thickness of 2.0 mm.

53. The method of claim 52, wherein said plastics sheet starting material has a minimum thickness of 4.7 mm.

54. A geogrid made by stretching and biaxially orienting a plastics starting material which was provided with an array of holes, the geogrid comprising at least three sets each of at least three spaced, parallel, effectively rectilinear continuous tensile members which extend through the geogrid and each of which comprises an oriented strand, a junction, an oriented strand, a junction, and so on, each junction interconnecting respective strands of the tensile member and the strands of the tensile member being substantially aligned with each other, the tensile members of each set making an angle with the tensile members of the other sets, and the junctions of one set also functioning as the junctions of the other sets whereby a tensile member of each of the sets intersects at the junction, mesh openings being defined by the tensile members, at substantially each said junction the crotch between each pair of adjacent strands being oriented in the direction running around the crotch, whereby there is continuous orientation from the edge of one strand, around the crotch and to the edge of the adjacent strand.

55. The geogrid of claim 54, wherein there are three sets of the continuous tensile members, six strands being interconnected by each junction and triangular mesh openings being defined by the tensile members.

56. The geogrid of claim 54, wherein one set of tensile members is substantially in the transverse direction.

57. The geogrid of claim 54, wherein said angle is substantially 60°.

58. A method of strengthening a particulate material, comprising embedding in the particulate material the geogrid of claim 54.

59. A geoengineering construction comprising a mass of particulate material strengthened by embedding therein a geogrid as claimed in claim 54.

60. The geogrid of claim 54, wherein said plastics starting material has a minimum thickness of 2.0 mm.

61. The geogrid of claim 60, wherein said plastics starting material has a minimum thickness of 4.7 mm.

* * * * *